Patented Dec. 2, 1952

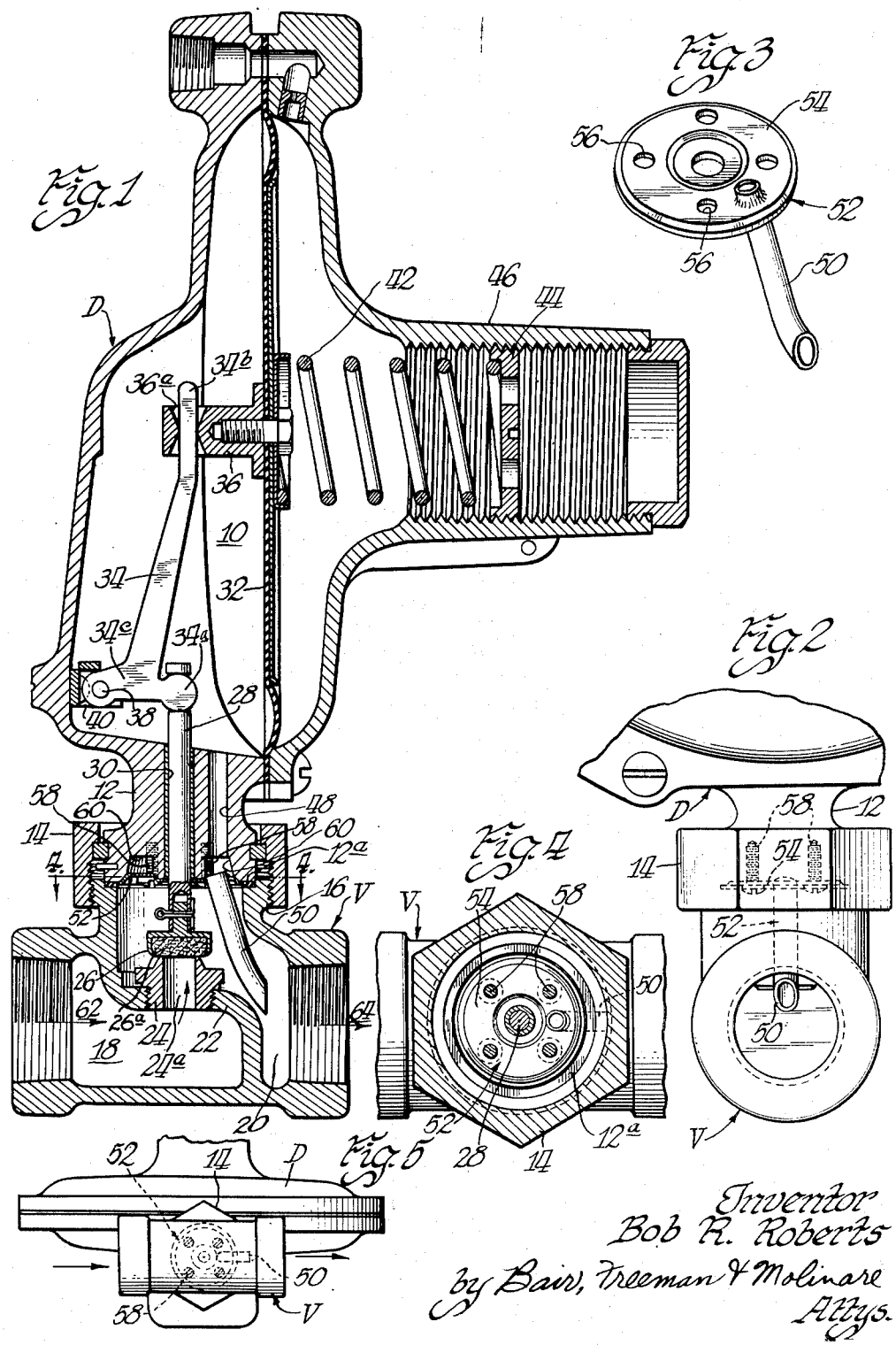

2,619,983

UNITED STATES PATENT OFFICE 2,619,983

UNIVERSAL DIAPHRAGM VALVE

Bob R. Roberts, Marshalltown, Iowa, assignor to Fisher Governor Company, Marshalltown, Iowa, a corporation of Iowa Application January 4, 1952, Serial No. 265,003

3 Claims. (Cl. 137—505)

My invention relates to an improved diaphragm valve unit of the Pitot tube type characterized by ability to operate with the valve housing at any one of a number of orientations with respect to the diaphragm housing.

Diaphragm type valve units are characterized by a diaphragm housing containing a pressure sensitive diaphragm and a valve housing defining a valve seat. The valve housing is connected in the gas or other pipe system to be controlled and the diaphragm housing extends laterally from that pipe.

Because of the size and shape of the diaphragm, the diaphragm housing is of flat noncircular conformation. It is usually of relatively large size in order to develop the necessary forces on the diaphragm. Moreover, in one type of diaphragm type valve unit, the diaphragm chamber is connected by a Pitot tube to the valve housing, which tube must be oriented in the downstream direction and extend into the valve unit.

The above requirements have heretofore been met only by a diaphragm valve unit wherein the valve unit and diaphragm unit have fixed orientations in relation to each other. This has caused serious installation problems as the rather large diaphragm housing interferes with other objects located adjacent the pipe to which the valve is connected.

In accordance with the present invention, this problem is overcome by so constructing the valve housing that it may be attached to the diaphragm housing at any one of many positions, all without interfering with the operation of the complete unit as a Pitot tube type regulating valve. This makes it possible to orient the diaphragm housing in the way that most effectively avoids obstructions. It further permits positioning of the diaphragm housing in such fashion that the chamber containing the spring is self-draining.

It is, therefore, a general object of the present invention to provide diaphragm type control valve of the Pitot tube type wherein the valve housing may be oriented in any one of many positions in relation to the diaphragm housing.

An additional object of the present invention is to provide an improved valve of the above description which is simple in construction, reliable in operation, and is characterized by ease of assembly and adjustment to its various operating positions.

The novel features which I believe to be characteristic of my invention are set forth with particularity in the appended claims. My invention itself, however, both as to its organization and method of operation, together with further objects and advantages thereof, will best be understood by reference to the following description taken in connection with the accompanying drawings, in which:

Figure 1 is a view in axial cross-section of a diaphragm type regulating valve constructed in accordance with the present invention;

Figure 2 is an end elevational view of a fragmentary portion of the valve of Figure 1.

Figure 3 is a view in perspective of the cap portion of the valve of Figures 1 and 2;

Figure 4 is a view through axis 4—4, Figure 1.

Figure 5 is a view from the bottom of the valve of Figure 1 with the diaphragm housing oriented at an alternate position to that of Figure 1.

Referring now to Figure 1, the valve consists of a diaphragm housing, generally indicated at D, secured to a valve housing, generally indicated at V. The diaphragm housing D has a diaphragm space 10 and an extending hub portion 12. Hub portion 12 defines a flat pad portion 12a, described in further detail hereafter.

The pad portion 12a receives the nut 14 which is threadedly received by the portion 16 of the valve housing V, thereby securing the two housings together as a unitary structure.

The valve housing V defines an inlet chamber 18 and an outlet chamber 20. Suitable threads are provided in each chamber to receive pipes so that the valve housing may be received on and form part of the pipe line whose pressure is to be controlled. Intermediate the inlet chamber 18 and the outlet chamber 20, the valve housing has a web portion 22 which threadedly receives the valve seat member 24 so as to define a valve seat between chambers 18 and 20 and oriented transversely to the axis of chambers 18 and 20.

A valve 26 having a cushioned seat member 26a is mounted on stem 28 for opening and closing motions on the seat 24. The stem 28 extends upwardly from the chamber 20 through the passage 30 in the hub 12 to the diaphragm chamber 10. It is connected to the diaphragm 32 by the rocker arm 34. Rocker arm 34 has a headed end 34a received in a mating slot in stem 28 and at its other end, 34b, is received in the conical hour-glass shaped slot 36a of the member 36 secured to diaphragm 32. The rocker arm is pivotally secured to the housing D at part 34c by the pivot pin 38 carried by the V-shaped bracket 40.

The diaphragm 32 is biased against the pressure in chamber 10 by the spring 42 which seats against the diaphragm and against the set screw 44. The screw 44 is adjustably received in the extending tube 46 formed on the housing D so that the regulated pressure can be adjusted to the desired value.

Communication is provided between the diaphragm chamber 10 and the outlet chamber 20 of the valve housing V by the passage 48 which extends through the hub 12 between these chambers. A curved tube 50, described in further detail hereafter, extends from the end of passage 48 into the chamber 20, this tube being oriented in a downstream direction to effect Pitot tube action.

The Pitot tube 50 is part of the cap assembly indicated generally at 52 and shown in perspective in Figure 3. As shown, this assembly includes an annular washer 54 having a series of holes 56 defining a square. The holes are all equally spaced from the center of the washer. As shown in Figure 1, the cap 52 is secured to the flat face 12a of the hub 12 by screws 58. Suitable threaded holes are provided in the hub 12 to receive these screws.

An annular groove 60 is formed in the flat face 12a of the hub 12 at the same distance from the stem 28 as the channel 48 and the Pitot tube 50. Consequently, the Pitot tube 50 is in communication with the hole 48 at all orientations of the cap 52.

The operation of the valve unit is as follows: gas or other fluid to be regulated enters the tube 18 in the direction of arrow 62, Figure 1. It then passes through the opening 24a of the valve seat 24 and into the outlet chamber 20, experiencing a pressure drop in accordance with the position of the valve 26. The gas then escapes as shown by arrow 64. Opening and closing movements are imparted to the valve 26 by movements of the diaphragm 32, acting through the rocker arm 34 and valve stem 28. These movements are responsive to pressure in the chamber 20 inasmuch as a path of communication is defined by Pitot tube 50 and channel 48. Thus, as the pressure in chamber 20 tends to increase the diaphragm 32 is moved in valve closing direction to produce a pressure drop tending to maintain the pressure in chamber 20 at a constant value.

The Pitot tube 50, being oriented in the downstream direction, causes the chamber 10 to respond, by aspirator action to the velocity of gas in chamber 20. This gives rise to positive valve opening and permits the use of a somewhat heavier spring 42 which provides more positive valve closure.

In accordance with the present invention, the valve housing V may be oriented in any one of many positions in relation to the diaphragm housing D. One of these positions is shown in Figure 1. The unit can be adjusted to a new position by first unscrewing the nut 14 and disassembling the valve housing V from the remainder of the unit. The screws 58 are then accessible and can be removed at which time the cap 52 may be rotated to the desired direction. The screws 58 can then be reinserted, the valve housing V attached to the diaphragm housing D at the desired orientation, and the nut 14 screwed in place to anchor the assembly as a unitary structure.

The valve housing V is adjusted to the selected orientation of the cap 52. This is done by holding the housing V in its selected position and drawing the nut 14 to tight position to anchor the valve housing V.

It will, of course, be understood that the cap 52 may have a greater or smaller number of holes 56 at common distances from the center of cap 52 and defining a regular polygon and that the threaded holes in hub 12 to receive screws 58 are positioned in accordance with the holes 56. By providing a greater or smaller number of holes and screws, a greater or smaller number of orientations of the Pitot tube 50 may be provided. Alternatively, the cap 52 may have one number of holes, say four, and a like number of screws 58 used, a larger number of threaded openings being provided to receive the screws to permit orientation of the cap to more than the four positions available with the four threaded holes shown in the figures.

In the appended claims I have referred to the axis of the diaphragm housing D as being the axis of the valve stem 28. The diaphragm is, of course, eccentrically located to the relation of this axis.

While I have shown and described a specific embodiment of the present invention, it will, of course, be understood that various modifications and alternative constructions may be made without departing from the true spirit and scope thereof. I, therefore, intend, by the appended claims, to cover all modifications and alternative constructions falling within their true spirit and scope.

What I claim is:

1. In combination: a diaphragm housing having an axis and a hub normal to that axis, the housing defining a diaphragm chamber; a valve housing having an inlet chamber, an outlet chamber and a valve seat therebetween; means to secure the valve housing to the hub at a selected orientation about the axis of the diaphragm housing; a valve adapted to fit on the valve seat and extending through the hub; the hub having an annular groove extending about the valve and in communication with the diaphragm chamber; a cap seating on the hub and having a Pitot tube extending into the outlet chamber of the valve housing; and, means adjustably securing the cap to the hub for adjustment to selected position to receive the valve housing with corresponding orientation.

2. In combination: a diaphragm housing having an axis and a hub normal to that axis, the housing defining a diaphragm chamber; a valve housing having an inlet chamber, an outlet chamber, and a valve seat therebetween; screw means securing the valve housing to the hub at a position of selected orientation about the axis of the diaphragm housing; a valve adapted to seat on the valve seat and extending through the hub; the hub having an annular groove extending about the valve and in communication with the diaphragm chamber; a cap seated on the hub and overlaying the groove, the cap having a Pitot tube extending into the outlet chamber of the valve housing, the cap having a series of four holes forming a square and having like spacings from the valve, the hub having threaded holes in alignment with the holes of the cap; and screws securing the cap to the hub.

3. In combination: a diaphragm housing having an axis and a hub normal to that axis, the housing defining a diaphragm chamber; a valve housing having inlet chamber, an outlet chamber and a valve seat therebetween; screw means securing the valve housing to the hub at a position of selected orientation about the axis of the diaphragm housing; a valve adapted to seat on the valve seat and extending through the hub; the hub having an annular groove extending about the valve and in communication with the diaphragm chamber; a cap seated on the hub and overlaying the groove, the cap having a Pitot tube extending into the outlet chamber of the valve housing, the cap having a multiplicity of holes at like spacings from the valve and defining a regular polygon, the hub having threaded holes in alignment with the holes of the cap; and screws securing the cap to the hub.

BOB R. ROBERTS.

REFERENCES CITED

The following references are of record in the file of this patent:

UNITED STATES PATENTS

| Number | Name | Date |
|---|---|---|
| Re. 22,151 | Ensign | Aug. 4, 1942 |
| 1,620,322 | Browne | Mar. 8, 1927 |
| 1,931,777 | Thrall | Oct. 24, 1933 |
| 2,059,104 | Harrah | Oct. 27, 1936 |
| 2,146,092 | Raymond | Feb. 7, 1939 |